Aug. 23, 1966 H. J. SMEAD ETAL 3,267,745
STABILIZED PLATFORM RAPID ALIGNMENT SYSTEM
Filed April 12, 1962
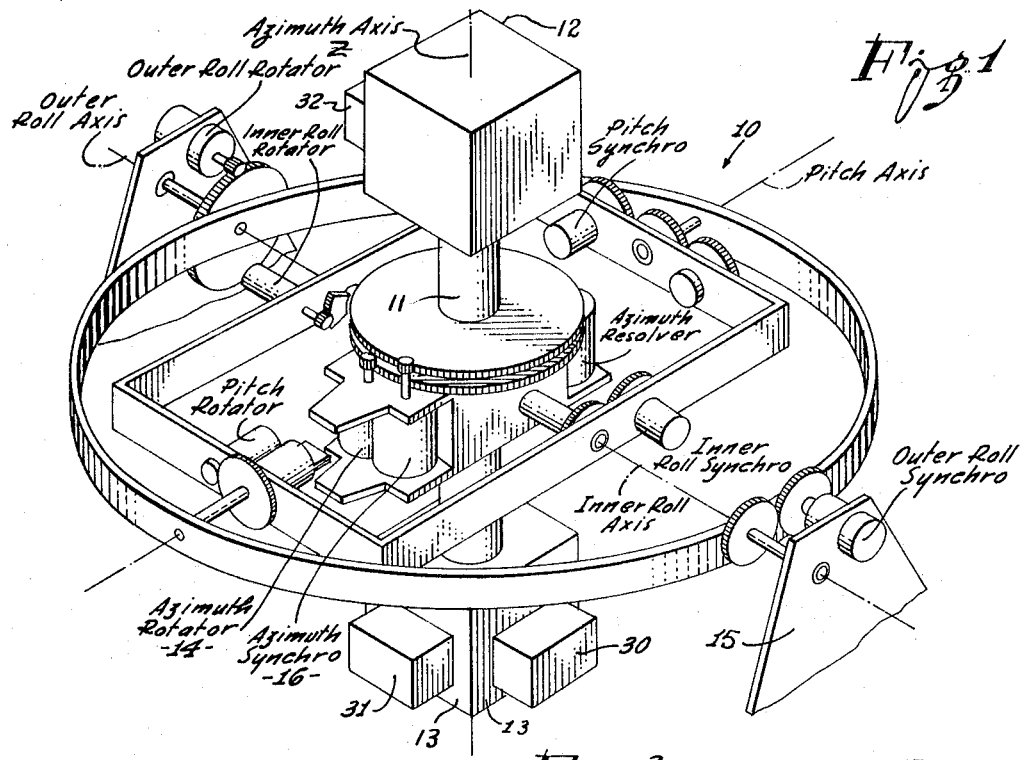
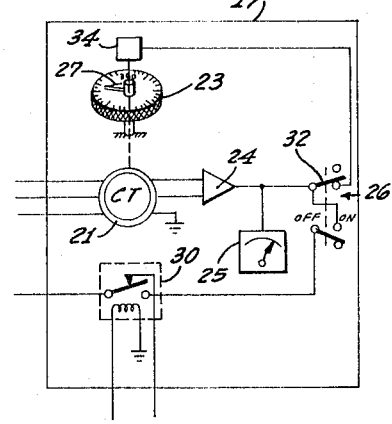
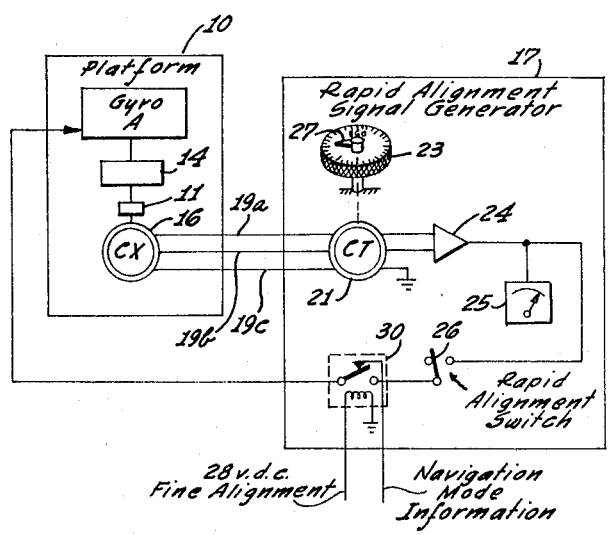
INVENTORS:
Harold J. Smead
Karl-Heinz Busch
By Richard K. Ehrlich
Attorneys

United States Patent Office 3,267,745
Patented August 23, 1966

3,267,745
STABILIZED PLATFORM RAPID
ALIGNMENT SYSTEM
Harold J. Smead, Sherman Oaks, Calif., and Karl-Heinz Busch, Bad Godesberg, Germany, assignors to Litton Systems, Inc., Beverly Hills, Calif.
Filed Apr. 12, 1962, Ser. No. 187,098
11 Claims. (Cl. 74—5.4)

The present invention relates to a stabilized platform alignment system and more particularly to a stabilized platform alignment system for re-aligning a platform concurrently with gyro warmup.

In the prior art, gyro stabilized inertial platforms utilized in conjunction with inertial navigational systems for airborne as well as other types of vehicles have been aligned by conventional gyro compassing techniques where a self-contained capability is required. However, in order to use gyro compassing techniques to align the platform in azimuth the gyros must be fully warmed and operating at synchronous speed so that azimuth alignment cannot take place until the gyros have completed the warming up operation. In addition, substantial amounts of time are required in order to filter out systems noise and/or vehicle rocking caused externally by wind gusts. Therefore, azimuth alignment cannot normally be started until the gyros are operating at their appropriate synchronous speed and temperature. Furthermore, even after the gyros have reached an operable state a relatively long period of time is required to align the platform with any degree of accuracy since internally and externally introduced errors require time to be filtered out.

Accordingly, usefulness of prior art inertial systems is severely limited in those applications where complete readiness of the vehicle and its inertial navigational system is required in a relatively short period of time after notice, as is the case, for example, in operational aircraft.

The present invention overcomes the foregoing described and other limitations of the prior art alignment systems by providing a platform alignment system wherein the platform azimuth orientation preceding shut-down is recorded or stored and upon later turn-on (application of power to the platform) the platform is aligned to the stored heading. In accordance with the invention, since the platform is driven or re-aligned in azimuth in accordance with stored information rather than through the operation of the platform gyros the alignment procedure can take place concurrently with gyro warmup and in an extremely short period of time since internal and external disturbances introduce little inaccuracy into the alignment process. More particularly, at some time previous to removing power from the platform or, in other words, before shutting down the platform, the platform azimuth signal indicative of the platform azimuth orientation is recorded either automatically or manually so that when the platform is turned on again at some later time, the azimuth signal generated by the platform can be compared with the recorded signal and the platform rotated in azimuth until the two signals are similar at which time the platform will be oriented or re-aligned to the same azimuth position as is held at the predetermined time. Accordingly, if the vehicle has not been moved during the time the platform has been inactive the platform will be properly aligned.

In one embodiment of the invention a gyro stabilized platform having a selsyn receiver mounted thereon for generating a synchro output azimuth signal representative of the azimuth orientation of the platform is coupled to a rapid alignment signal generator which includes a hand-set synchro transmitter which produces a torquing signal representative of the difference between a comparison signal generated by the selsyn transmitter and the selsyn receiver azimuth signal.

In operation, at some previous time to platform turn-off and while the platform is still aligned in azimuth the hand-set control of the selsyn transmitter is rotated until the torquing signal is nulled, the nulled torquing signal indicating that the comparison signal and the azimuth signal produced by the selsyn receiver are substantially equal. Since the hand-set knob is mechanized in such a fashion that it will remain stationary after nulling, the azimuth signal generated at the predetermined time has now been permanently recorded so that upon re-activation of the platform at some later time, a torquing signal from the rapid alignment signal generator which is applied to the platform azimuth gyro torquer actuates the platform to experience azimuth rotation until such time as the azimuth signal generated by the platform selsyn receiver is equal to the comparison signal generated by the rapid alignment signal generator at which time the torquing signal will be at a null and the platform will no longer be actuated to experience azimuth rotation.

In another embodiment of the invention, the rapid alignment signal generator is similar to that previously described except that the rapid alignment signal generator is mechanized in such a fashion that the nulling or recording operation is automatically performed.

It is therefore an object of the present invention to provide a platform rapid alignment system which can accurately align the platform in azimuth by self-contained means without reliance upon the accuracy of the platform gyros.

It is another object of the present invention to provide a rapid re-alignment system for re-aligning a stabilized platform after turn-on to the same azimuth orientation exhibited by the platform just previous to platform turn-off.

It is a further object of the present invention to provide an azimuth alignment system wherein platform alignment before turn-off is stored so that upon subsequent platform turn-on the platform can be aligned in accordance with the stored information.

Another further object of the present invention is to provide a rapid alignment system whereby a stabilized platform can be aligned in azimuth concurrently with the erection of the platform.

It is a still further object of the present invention to provide a rapid alignment system whereby a gyro stabilized platform can be aligned in azimuth before the gyros have reached synchronous speed and operating temperature.

The novel features which are believed to be characteristic of the invention, both as to its organization and method of operation, together with further objects and advantages thereof, will be better understood from the following description considered in connection with the accompanying drawing in which several embodiments of the invention are illustrated by way of example. It is to be expressly understood, however, that the drawing is for the purpose of illustration and description only, and is not intended as a definition of the limits of the invention.

FIGURE 1 is a three-dimensional view of a gyro stabilized platform utilized in conjunction with the rapid alignment system of the present invention.

FIGURE 2 is a partly block-partly circuit diagram of one embodiment of a rapid alignment system of the present invention.

FIGURE 3 is a partly block-partly circuit diagram of another embodiment of a rapid alignment system of the invention.

With reference now to the drawings wherein like or corresponding parts are similarly designated throughout the several views, there is shown in FIGURE 1 a gyro-stabilized platform generally designated 10 including a pair of compensated two-degree-of-freedom gyroscopes designated gyro A and gyro B which are affixed to and stabilize a stabilizable element 11, gyros A and B being contained within enclosing boxes 12 and 13. It should be noted in reference to a two-gyro, two-degree-of-freedom gyro mechanization that such a platform is given as one illustration of the use of the present invention, since the basic concepts of the present invention are applicable to any gyro stabilized platform configuration. As will be described herein, gyros A and B operate in coordination with one another to define the platform coordinate system which is fixed in spacial orientation. More particularly, as is well known in the art, the gyros sense any rotational displacement of stabilizable element 11 and generate pick-off signals representative thereof which are used to rotate element 11 with respect to reference frame 15 to continuously stabilize the platform in inertial space.

As is apparent from FIGURE 1, in order to allow stabilizable element 11 to be freely rotated with respect to the reference frame, element 11 is mounted in a four-axis gimbal suspension system. While one skilled in the art should be acquainted with the manner of operation of such a gimbal system to rotate the stabilizable element relative to the frame in response to the pick-off signals, attention is directed to U.S. Patent No. 2,949,795 issued August 23, 1960 to H. E. Singleton, entitled, "Low Drift Gyro Stabilized Platform" wherein there is contained a detailed discussion of such a system and its operation.

More particularly, as is noted in FIGURE 1 element 11 is rotated about an azimuth axis Z by an azimuth rotator 14 and the angular position of stabilizable element 11 about the axis is sensed by a three-phased azimuth selsyn receiver synchro 16. As will be hereinafter explained, in accordance with the present invention the output of synchro 16 is utilized to store or remember the azimuth position of the platform at a predetermined time subsequent to the de-activation or turn-off of the platform so that at a later time after subsequent activation of the platform the signal from synchro 16 can be compared to the stored information and the platform rotated by rotator 14 until the two signals are identical at which time the platform will be aligned to the same azimuth position exhibited by the platform at the predetermined time.

Accordingly, if the frame or vehicle 15 to which the platform is mounted has not been subjected to a change in orientation during the time of platform de-activation, upon actuation the platform will be rapidly aligned in azimuth without recourse to the platform gyro signals.

With reference now to FIGURE 2, there is shown a partly block-partly schematic view of the stabilized platform alignment system of the invention. As is shown in FIGURE 2, the alignment system includes a rapid alignment signal generator 17 and platform 10, platform 10 having azimuth rotor 14 connected to azimuth gyro A in such a fashion that the pick-off signal from the gyro actuates rotor 14 to rotate element 14 until by conventional gyro-compassing techniques whereby the platform is kept properly aligned in azimuth. As is further shown in FIGURE 2, azimuth synchro 16 is in turn connected to stabilize element 11 to produce a three-phase azimuth signal 19 which is carried over a plurality of similarly designated conductors 19a, 19b and 19c to rapid alignment signal generator 17, azimuth signal 19 being, of course, representative of the azimuth orientation of stabilizable element 11 of platform 10. Referring now to rapid alignment signal generator 17 three-phase azimuth signal 19 is applied to a hand-set selsyn control transmitter 21 having a hand-set screw 23 which in turn generates a comparison signal representative of the position of hand-set screw 23 and a three-phase torquing signal representative of the difference existing between the comparison signal and the azimuth signal from control receiver 16. As is indicated in FIGURE 2, one of the three-phase legs of the torquing signal is grounded while the remaining two-phase components are applied to an amplifier and phase sensitive demodulator 24 which demodulates the two-phase A.C. signal to generate a D.C. torquing signal whose magnitude is representative of the difference existing between the comparison signal generated by transmitter 21 and the azimuth signal generated by receiver 16. As is further indicated in FIGURE 2, the demodulated torquing signal is constantly applied to a meter 25 and selectively applied through the operation of a pair of throw switches 26 and 30 to azimuth gyro A of platform 10.

Continuing with the discussion of the invention and the operation of the rapid alignment signal generator, to activate platform 10 to properly align itself independent of gyro compassing techniques the operation of the alignment system of the invention must be examined prior to platform de-activation before the process of alignment after re-activation can be understood. Prior to platform de-activation stabilizable element 11 is maintained properly aligned in azimuth by conventional gyro stabilized platform techniques and transmitter 16 generates azimuth signal 19 representative of the azimuth position of stabilizer element 11. In accordance with the invention, at a predetermined time just prior to platform de-activation and after the vehicle containing the platform has been permanently positioned, hand-set screw 23 is rotated until meter 25 indicates that the torquing signal is reduced to a null. As has been heretofore explained when the torquing signal is at a null, the comparison signal generated by transmitter 21 and azimuth signal 19 generated by receiver 16 are similar so that azimuth signal 19 is effectively recorded. In this regard, the hand-set screw mechanism is mechanized in such a fashion that the screw will remain securely in position after adjustment so that the comparison signal equal to the azimuth signal at the predetermined time can be reproduced at any later time. Furthermore, as is shown in FIGURE 2, by properly affixing an arrow 27 to the transmitter case and positioning an angular scale on the planar surface of set screw 23 the recorded azimuth orientation can be read off the face of the set screw.

Examining now the manner of operation of the invention, upon re-activation of the platform, at some subsequent time element 11 can now be rapidly aligned to the same azimuth position exhibited at the predetermined time, it being clear that this position is the proper azimuth orientation for stabilizable element 11 when it is realized that the vehicle for platform mount was permanently positioned prior to the predetermined time and has not undergone movement since then. More particularly, since the azimuth position is recorded the platform can be quickly aligned concurrently with activation of the platform gyros by simply closing rapid alignment switch 26 at the same time that power is applied to platform 10. As is apparent, upon the closure of switch 26 the torquing signal is applied to the azimuth gyro A of platform 10, the magnitude of the torquing signal being, of course, representative of the difference between the stored azimuth information as represented by the comparison signal and the actual azimuth position of the platform as represented by the azimuth signal generated by receiver 16. Accordingly, applying the torquing signal to gyro A causes the gyro to precess whereby the platform is actuated to rotate about the azimuth axis. This platform rotation continues until the azimuth signal 19 generated by receiver 16 is equal to the comparison signal at which time the torquing signal will be at a null and the azimuth position of the platform will be similar to that exhibited by the platform at the predetermined time.

Continuing, when sufficient time has elapsed for the platform gyros to come to synchronous speed and to the operating temperature so that the platform is ready to go in the navigational mode of operation, switch 30 is automatically actuated by external apparatus to disconnect rapid alignment signal generator 17 and to interconnect the azimuth gyro to navigational mode information sources whereby the platform is fully operational. The platform could not, of course, be ready at this time to receive navigational information, if the platform had not been aligned concurrently with gyro warm-up.

In contrast, in prior art devices, platform alignment takes place by gyro compassing techniques subsequent to gyro warm-up and then accurate alignment is only obtained after the passage of considerable periods of time.

It should be apparent that numerous modifications and alterations may be made in the embodiment of the invention shown in FIGURE 1 without departing from the basic concepts of the present invention. For example, there is shown in FIGURE 3 a modified signal generator 17 wherein recordation of the azimuth position of the platform at a given predetermined time is accomplished automatically without recourse to manual adjustment of the hand set screw.

As is shown in FIGURE 3, the modulated D.C. torquing signal generated by amplifier and phase sensitive demodulator 24 is selectively applied through a switch 32 to a D.C. motor 34 which is connected to thumb screw 23 for turning the thumb screw until indicator 25 indicates that the torquing signal is at a null. More particularly, switch 32 is physically connected to rapid alignment switch 26 in such a manner that switch 32 is closed when the alignment switch is off and vice-versa. Hence, control transmitter 21 is constantly servoed to follow control receiver 16 so that indicator 27 continually represents the azimuth orientation of the platform during operation of the platform in the navigational mode. Accordingly, the rapid alignment signal generator will always have stored therein the current azimuth heading of the active platform so that whenever the platform is de-activated or turned off the last azimuth heading of the active platform would be stored by rapid alignment signal generator 17 so that upon re-activation of the platform, the platform can be aligned in accordance with the stored azimuth heading.

Continuing with the discussion of the invention, when the rapid alignment switch 26 is turned to the on-position upon re-activation of platform 10 switch 32 is automatically opened so that the stored heading information cannot be destroyed. After the platform has been re-aligned and switched to the navigation mode of operation and the rapid alignment system is turned off by opening switch 26, switch 32 is again closed so that the current platform heading is again continuously stored.

It is therefore clear that remarkable reductions in platform alignment time can be obtained by the rapid alignment system of the present invention. It should also be clear that numerous other modifications and alterations may be made in the alignment system described herein without departing from the spirit and scope of the invention. For example, if the vehicle or object upon which the platform is mounted experiences a known change in azimuth during the period of de-activation of the platform, the rapid alignment signal generator can be mechanized to alter the nature of the recorded azimuth information to take into account the known change in azimuth experienced during the period of de-activation so that upon activation of the platform the platform will be aligned rapidly to the true azimuth heading. Accordingly, the spirit and scope of the present invention is to be limited only by the scope of the appended claims.

What is claimed as new is:

1. In combination:
    a vehicle;
    a gyroscopically stabilized platform, supported by said vehicle, capable of azimuth alignment, including at least an azimuth gyroscope for stabilizing and positioning said platform about an azimuth axis, electromagnetic torquing means coupled to said azimuth gyroscope to cause said gyroscope to precess about said azimuth axis in response to electrical torquing signals, and electrical angular sensing means connected and positioned to generate an electrical azimuth signal which is a measure of the azimuth angle of said platform relative to said vehicle;
    a shaft;
    second electrical angular sensing means, connected to and positioned in response to the position of said shaft, electrically connected to receive said electrical signal from said first angular sensing means, and adapted to generate a difference signal which is a measure of the angular difference between said azimuth angle and the angle of said shaft;
    electro-mechanical servo means including an electric motor mechanically connected to drive said shaft, and an amplifier electrically connected to receive and amplify said difference signal, said amplifier being electrically connected, in a first mode of operation to drive said motor and in second mode of operation to drive said electromagnetic torquing means.

2. A device as recited in claim 1 in which said amplifier is connected in said first mode during operation of said platform and in said second mode during alignment of said platform, and further comprising means for disconnecting said servo means while locking said shaft position when drive power is removed from said azimuth gyroscope.

3. A device as recited in claim 1 and further comprising switching means electrically connected to the output of said amplifier, adapted to be electrically connected in a first condition to said motor until said difference signal is zero, and adapted to be electrically connected in a second condition to said electromagnetic torquing means until said difference signal is zero.

4. A device as recited in claim 1 and further comprising switching means electrically connected to the output of said amplifier, adapted to be connected in a first condition to connect said amplifier to drive said motor to cause the position of said shaft to become a record of the azimuth angle of said platform, and adapted to be connected in a second condition to connect said amplifier to drive said electromagnetic torquing means to cause said platform to be aligned to the stored heading.

5. In combination:
    a vehicle;
    a gyroscopically stabilized platform supported by said vehicle, capable of azimuth alignment, including at least an azimuth gyroscope for stabilizing and positioning said platform about an azimuth axis, an azimuth gyro-torquer coupled to said azimuth gyroscope to cause said gyroscope to rotate about said azimuth axis in response to electrical torquing signals, and an azimuth synchro transmitter positioned to generate a synchro output azimuth signal which is a measure of the azimuth orientation of the platform relative to said vehicle;
    a synchro receiver, electrically connected to receive said synchro output azimuth signal from said azimuth synchro transmitter, capable of storing an angular position, and adapted to generate a torquing signal which is the measure of the angular difference between the azimuth orientation of said platform and the angular position stored by said synchro receiver;
    electro-mechanical servo means, including an electric motor, mechanically connected to drive said synchro receiver, an amplifier electrically connected to amplify said torquing signals, switching means electrically connected to said amplifier to switch said torquing signal in a first condition of said switching means to said motor to null said torquing signal, and in a second condition to said switching means to drive said azimuth gyro-torquer to null said torquing signal.

6. In combination:
a vehicle;
a gyroscopically stabilized platform supported by said vehicle, capable of azimuth alignment, including at least an azimuth gyroscope for stabilizing and positioning said platform about an azimuth axis, an azimuth gyro-torquer coupled to said azimuth gyroscope to cause said gyroscope to rotate about said azimuth axis in response to electrical torquing signals, and an azimuth synchro transmitter positioned to generate a synchro output azimuth signal which is a measure of the azimuth orientation of the platform relative to said vehicle;
a synchro receiver, electrically connected to receive said synchro output azimuth signal from said azimuth synchro transmitter, capable of storing an angular position, and adapted to generate a torquing signal which is the measure of the angular difference between the azimuth orientation of said platform and the angular position stored by said synchro receiver;
electro-mechanical servo means, including an electric motor, mechanically connected to drive said synchro receiver, an amplifier electrically connected to amplify said torquing signals, switching means electrically connected to said amplifier to switch said torquing signal in a first condition of said switching means to cause the angular position stored by said synchro receiver to become a measure of the azimuth orientation of said platform, and in a second condition of said switching means to said gyro-torquer to cause the azimuth orientation of said platform to become a measure of the angular position stored by said synchro receiver.

7. A method for rapidly re-aligning a previously aligned gyro-stabilized platform on a supporting vehicle to a predetermined azimuth, said platform having at least an azimuth gyroscope, comprising:
maintaining said vehicle angularly stationary;
measuring the azimuth angle between a datum on said azimuth gyroscope and a datum on said vehicle;
storing the measure of said angle during deactivation of said platform;
reactivating said platform; and
applying torque between said gyroscope and said platform, said torque being a function of the difference between the azimuth angle of said gyroscope and said stored measure.

8. A method for rapidly re-aligning a previously gyro-stabilized platform on a supporting vehicle to a predetermined azimuth position, said platform having at least an azimuth gyroscope, and said method using an independent rotatable member, comprising:
maintaining said vehicle stationary;
generating an azimuth signal which is a measure of the angular orientation of said azimuth gyroscope;
driving said rotatable member in accordance with said signal until its angular position is a measure of the angular position of said azimuth gyroscope;
maintaining said rotatable member stationary in its said angular position during deactivation of said platform;
re-activating said platform;
generating a torquing signal which is a measure of the angular difference between the azimuth angular orientation of said gyroscope and the said angular position of said rotatable member;
applying said torquing signal to the said azimuth gyroscope until the azimuth angular orientation of said platform is a measure of the angular position of said rotatable member.

9. A method for rapidly re-aligning a previously aligned gyro-stabilized platform on a supporting vehicle to a predetermined azimuth position, said platform having at least an azimuth gyroscope, and said method using an independently rotatable member, comprising:
maintaining said vehicle stationary;
driving said rotatable member until its angular position is a measure of the angular position of said azimuth gyroscope;
maintaining said rotatable member stationary in its said angular position during deactivation of said platform;
generating a torquing signal which is a measure of the angular difference between the azimuth angular orientation of said gyroscope and the said angular position of said rotatable member;
applying said torquing signal to said azimuth gyroscope after said platform is re-energized until the angular orientation of said azimuth gyroscope is the same orientation exhibited by said gyroscope previous to the period of deactivation.

10. A method of rapidly re-aligning a previously aligned gyro-stabilized platform on a supporting vehicle to a predetermined azimuth, said platform having at least an azimuth gyroscope, comprising:
maintaining said vehicle stationary;
generating a platform azimuth signal which is a measure of the platform azimuth orientation;
recording the measure of said platform azimuth orientation;
turning off said platform;
maintaining said record of said platform azimuth orientation during the deactivation of said platform;
turning on said platform;
generating a torquing signal which is a measure of the angular difference between said recorded platform azimuth orientation and the platform azimuth orientation subsequent to reactivation;
applying said torquing signal to said azimuth gyroscope until said azimuth gyroscope is re-aligned in the predetermined azimuth position.

11. A method of rapidly re-aligning a previously aligned and operating gyro-stabilized platform on a supporting vehicle to a predetermined azimuth position, said platform having at least an azimuth gyroscope, and said method using an independently rotatable member, comprising:
maintaining said vehicle stationary;
generating an azimuth signal which is a measure of angular orientation of said azimuth gyroscope;
generating a signal which is a measure of the angular position of said rotatable member;
generating a difference signal, in response to said above mentioned signals, which is a measure of the angular difference between the azimuth angular orientation of said gyroscope and the angular position of said rotatable member;
rotating said rotatable member before said platform is turned off until said difference signal is nulled;
maintaining said rotatable member stationary in its angular position during deactivation of said platform;
applying said difference signal to the said azimuth gyroscope after said platform is re-energized until said difference signal is nulled.

References Cited by the Examiner
UNITED STATES PATENTS
2,524,756  10/1950  Braddon et al. _____ 74—5.4 X FOREIGN PATENTS
600,938  4/1948  Great Britain.

FRED C. MATTERN, Jr., *Primary Examiner.*
BROUGHTON G. DURHAM, *Examiner.*
K. DOOD, P. W. SULLIVAN, *Assistant Examiners.*